United States Patent
Masin et al.

(10) Patent No.: US 10,489,198 B2
(45) Date of Patent: Nov. 26, 2019

(54) SCHEDULING WORKLOAD SERVICE OPERATIONS USING VALUE INCREASE SCHEME

(71) Applicant: International Business Machines Corporation, Armonk, NY (US)

(72) Inventors: Michael Masin, Haifa (IL); David Breitgand, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/814,426

(22) Filed: Nov. 16, 2017

(65) Prior Publication Data

US 2019/0146841 A1   May 16, 2019

(51) Int. Cl.
  *G06F 9/50* (2006.01)
  *G06F 9/48* (2006.01)
  *H04L 12/24* (2006.01)
  *G06Q 30/04* (2012.01)

(52) U.S. Cl.
  CPC .............. *G06F 9/50* (2013.01); *G06F 9/4881* (2013.01); *G06F 9/505* (2013.01); *H04L 41/5029* (2013.01); *G06Q 30/04* (2013.01)

(58) Field of Classification Search
  None
  See application file for complete search history.

(56) References Cited

U.S. PATENT DOCUMENTS

2012/0131594 A1*  5/2012  Morgan ............... G06F 9/5072
                                                        718/105

OTHER PUBLICATIONS

Gohad, et al., "Cloud Pricing Models: A Survey and Position Paper", Oct. 2013, IEEE. (Year: 2013).*

* cited by examiner

*Primary Examiner* — Qing Yuan Wu
(74) *Attorney, Agent, or Firm* — Barry Blount

(57) ABSTRACT

An example method includes receiving a nominal equivalent resource usage data, an infrastructure usage data, an effective production capacity, a demand elasticity curve, and workload scheduling constraints across a plurality of accounts. The method includes calculating an equivalent resource utilization based on the nominal equivalent resource usage data, the infrastructure usage data, and the effective production capacity. The method includes calculating a potential value increase for a service based on the workload scheduling constraints, the nominal equivalent resource usage data, the effective production capacity, and the demand elasticity curve. The method includes calculating a value increase scheme for the service based on the potential value increase and sending the value increase scheme to a user workload device. The method includes receiving a workload constraint from the user workload device and scheduling a workload service operation based on the infrastructure usage data, the value increase scheme, and the workload constraint.

20 Claims, 6 Drawing Sheets

SCHEDULING WORKLOAD SERVICE OPERATIONS USING VALUE INCREASE SCHEME

BACKGROUND

The present techniques relate to scheduling workload service operations. More specifically, the techniques relate to scheduling workload service operations using a value increase scheme.

SUMMARY

According to an embodiment described herein, a system can include processor to receive a nominal equivalent resource usage data, an infrastructure usage data, an effective production capacity, a demand elasticity curve, and workload scheduling constraints across a plurality of accounts. The processor can also further calculate an equivalent resource utilization for an equivalent resource in a nominal billing time series based on the nominal equivalent resource usage data, the infrastructure usage data, and the effective production capacity. The processor can also calculate a potential value increase for a service based on the workload scheduling constraints, the nominal equivalent resource usage data, the effective production capacity, and the demand elasticity curve. The processor can further calculate a value increase scheme for the service based on the potential value increase. The processor can send the value increase scheme to a user workload device. The processor can also receive a workload constraint from the user workload device. The processor can also further schedule a workload service operation based on the infrastructure usage data, the value increase scheme, and the workload constraint.

According to another embodiment described herein, a method can include receiving, via a processor, a nominal equivalent resource usage data, an infrastructure usage data, an effective production capacity, a demand elasticity curve, and workload scheduling constraints across a plurality of accounts. The method can further include calculating, via the processor, an equivalent resource utilization for an equivalent resource in a nominal billing time series based on the nominal equivalent resource usage data, the infrastructure usage data, and the effective production capacity. The method can also further include calculating, via the processor, a potential value increase for a service based on the workload scheduling constraints, the nominal equivalent resource usage data, the effective production capacity, and the demand elasticity curve. The method can also include calculating, via the processor, a value increase scheme for the service based on the potential value increase. The method can include sending, via the processor, the value increase scheme to a user workload device. The method can also include receiving, via the processor, a workload constraint from the user workload device. The method can also further include scheduling, via the processor, a workload service operation based on the infrastructure usage data, the value increase scheme, and the workload constraint.

According to another embodiment described herein, a computer program product for scheduling workload service operations can include computer-readable storage medium having program code embodied therewith. The computer readable storage medium is not a transitory signal per se. The program code is executable by a processor to cause the processor to receive a nominal equivalent resource usage data, an infrastructure usage data, an effective production capacity, a demand elasticity curve, and workload scheduling constraints across a plurality of accounts. The program code can also cause the processor to calculate an equivalent resource utilization for an equivalent resource in a nominal billing time series based on the nominal equivalent resource usage data, the infrastructure usage data, and the effective production capacity. The program code can also cause the processor to calculate a potential value increase for a service based on the workload scheduling constraints, the nominal equivalent resource usage data, the effective production capacity, and the demand elasticity curve. The program code can also cause the processor to calculate a value increase scheme for the service based on the potential value increase. The program code can also cause the processor to send the value increase scheme to a user workload device. The program code can also cause the processor to also further receive a workload constraint from the user workload device. The program code can also cause the processor to schedule a workload service operation based on the infrastructure usage data, the value increase scheme, and the workload constraint.

DETAILED DESCRIPTION

Figure 1:
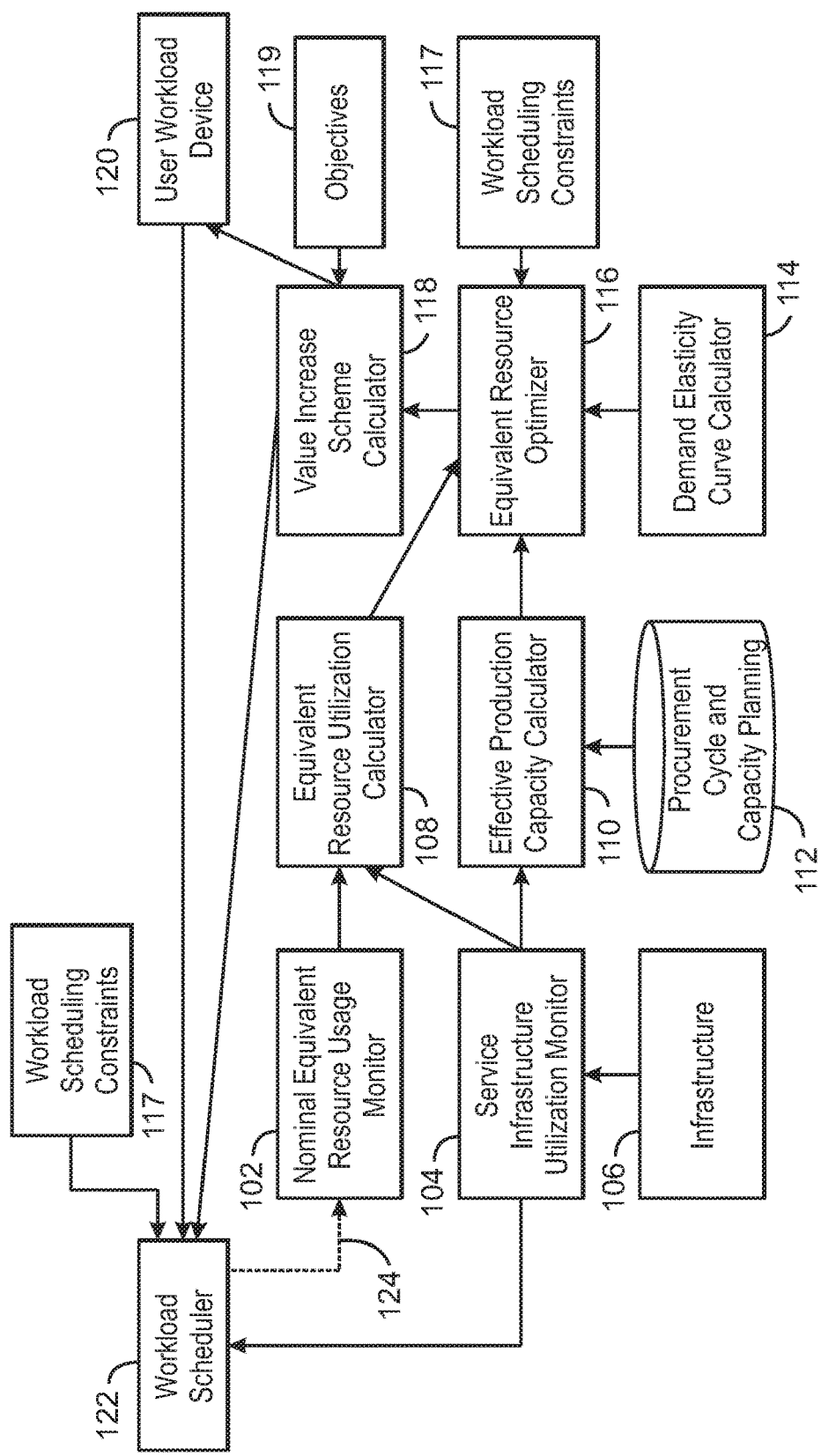
FIG. 1 is a block diagram of an example system for scheduling workload service operations using a value increase scheme.

Cloud computing services including Infrastructure as a Service (IaaS), Platform as a Service (PaaS), Database as a Service (DBaaS), Business Process as a Service (BPaaS), etc., may be collectively referred to as "X as a service," (XaaS). Some workloads, particularly workloads originating in the cloud, may seamlessly utilize resources and services across a XaaS cloud stack. To set incentives for the customers to indicate their future anticipated use, different forms of service volume discounts may be offered by cloud service providers. However, these incentives may be disparate across the XaaS stack, which complicates cost optimization on the customer's side. Since customers may not fully react on the incentives they do not fully understand, this reduces both provider's cost-efficiency or server resource utilization and consumer's cost-savings. Moreover, users may not have any incentives to exploit statistical multiplexing across cloud applications portfolio tied to a paying account in current incentives. For example, the timing or scheduling of consuming resources on the cloud may not change usage cost.

According to embodiments of the present disclosure, a value increase scheme can be used to schedule workload service operations. A value increase scheme, as used herein, includes prices and sustained usage discounts for one or more cloud services. In particular, the value increase scheme may be universally applied across all services offered by a XaaS stack. For example, a system may include a processor to receive a nominal equivalent resource usage data, an infrastructure usage data, an effective production capacity, a demand elasticity curve, and workload scheduling constraints across a plurality of accounts. The processor can calculate an equivalent resource utilization for an equivalent resource in a nominal billing time series based on the nominal equivalent resource usage data, the infrastructure usage data, and the effective production capacity. The processor can calculate a potential value increase for a service based on the workload scheduling constraints, the nominal equivalent resource usage data, the effective production capacity, and the demand elasticity curve. The processor may then calculate a value increase scheme for the service based on the potential value increase. The processor can send the value increase scheme to a user workload device and receive a workload constraint from the user workload device. The processor can then schedule a workload service operation based on the infrastructure usage data, the value increase scheme, and the workload constraint. The techniques described herein may thus provide a user with incentives to smooth out resource consumption by scheduling workloads with mutable constraints in between the spikes of workloads with immutable constraints. Thus, the techniques described herein may be used to lower the variance of service demand and allow service providers to reduce volatility in resource demand that forces them to deploy larger physical capacities than used. Therefore, the present techniques may increase average utilization of physical capacities, enabling more efficient use of server resources. The saved resources may thus be used to provide additional incentives to users to further smooth out resource consumption. For example, the value increase scheme may provide better value to customers by sharing resource savings with the customers. Moreover, the techniques described herein may enable simplification of management of service by offering a universal scheme for providing services. In addition, the techniques described herein may enable simplification of service monitoring. For example, as new services are added, there may be less management overhead for managing services offerings per service. The techniques described herein may also provide clarity for consumers. For example, the techniques described herein may make it easier to navigate through large portfolio services, each service having its own pricing plan with associated discounts. Thus, the techniques described herein may enable the use of one portfolio for each user to intuitively manage. Furthermore, the techniques described herein are flexible and transparent to the approach used for nominal pricing of different services.

In some scenarios, the techniques described herein may be implemented in a cloud computing environment. As discussed in more detail below in reference to at least FIGS. 3-5, a computing device configured to schedule workload operations using a value increase scheme may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, a block diagram shows an example system for scheduling workload service operations using a value increase scheme. The example system is generally referred to by the reference number 100. The system 100 of FIG. 1 includes a nominal equivalent resource usage monitor 102, a service infrastructure utilization monitor 104, and an infrastructure 106. The system 100 also includes an equivalent resource utilization calculator 108 communicatively coupled to the nominal equivalent resource usage monitor 102 and the service infrastructure utilization monitor 104. The system further includes a production capacity calculator 110 communicatively coupled to the service infrastructure utilization monitor 104 and a procurement cycle and capacity planning database 112. The system 100 includes a demand elasticity curve calculator 114 communicatively coupled to an equivalent resource optimization calculator 116. The equivalent resource optimization calculator 116 is further communicatively coupled to the equivalent resource utilization calculator 108, the production capacity calculator 110, and a value increase scheme calculator 118. The system 100 further also includes a user workload device 120 communicatively coupled to the value increase scheme calculator 118. The system also includes a workload scheduler 122 communicatively coupled to the user workload device 120, the nominal equivalent resource usage monitor 102, and the service infrastructure utilization monitor 104.

In the example of FIG. 1, the nominal equivalent resource usage monitor 102 can monitor and accumulate nominal billing files. For example, the nominal billing files may include nominal charges by a paying account for all resources or services at a predefined charging granularity interval. The nominal equivalent resource usage monitor 102 can accumulate such charges to form a time series of costs incurred by the paying account across all cloud workloads at different levels of abstraction (IaaS, PaaS, SaaS, etc.) over a single billing period.

In some examples, the nominal equivalent resource usage monitor 102 may be part of a billing system of a cloud service. The nominal billing files accumulated by the nominal equivalent resource usage monitor 102 can be sent to the equivalent resource utilization calculator 108 and the equivalent resource optimization calculator 116.

The service infrastructure utilization monitor 104 can collect standard information about resource utilization of the underlying capacity used to provide the service. For example, the information can include CPU, memory, and disk usage. In some examples, the service infrastructure utilization monitor 104 may be part of an infrastructure management toolbox used by service providers. The output of service infrastructure utilization monitor 104 may be fed as input to the production capacity calculator 110. Also, the output of the infrastructure utilization monitor 104 can then further be fed to the equivalent resource utilization calculator 108.

The infrastructure 106 can include one or more servers. For example, one or more of the servers may include the computing device 300 below.

The equivalent resource utilization calculator 108 can calculate an equivalent resource utilization for each equivalent resource in the nominal billing time series based on the nominal equivalent resource usage data and the infrastructure usage data. In some examples, the equivalent resource utilization calculator 108 can execute once per billing period and receive input from the nominal equivalent resource usage monitor 102, the service infrastructure utilization monitor 104, and calculate an equivalent resource utilization for each equivalent resource in the nominal billing time series. For example, the equivalent resource may be measured in dollars, or any other suitable value. In some examples, for each equivalent resource, the equivalent resource utilization calculator 108 can compute how much time out of the billing period the equivalent resource was used. The input from the service infrastructure utilization monitor 104 helps the equivalent resource utilization calculator 108 to understand how much time each nominal equivalent resource unit paid was in actual use. For example, a service request may incur an equivalent resource unit in the nominal billing time series obtained from the nominal equivalent resource usage monitor 102 at the same time it is known from the capacity utilization data obtained from the service infrastructure utilization monitor 104 that this request executed for one hour. The equivalent resource utilization calculator 108 can determine that such equivalent resource was utilized for one hour regarding this service request. In some examples, equivalent resource utilization calculator 108 can calculate a total equivalent resource utilization curve over the whole billing period and over the whole nominal bill and utilization data.

The production capacity calculator 110 uses utilization data from the service infrastructure utilization monitor 104 overlaid on the data for capacity specifications and cost obtained from the procurement cycle and capacity planning database 112 of a capacity procurement cycle support system (not shown). In some examples, the production capacity calculator 110 can execute once per billing period. In some examples, the production capacity calculator 110 can execute at discrete times to trigger value increase scheme recalculation.

The procurement cycle and capacity planning database 112 can contain cost, amortization, purchasing lead time, and other data on resources influencing their availability and costs. In some examples, the procurement cycle and capacity planning database 112 may be part of the operations support of a service provider.

The demand elasticity curve calculator 114 can use internal and external long-term data on pricing and service demand to build a demand elasticity curve for a service. In some examples, the demand elasticity curve calculator 114 can be executed periodically. In some examples, the demand elasticity curve calculator 114 can be executed at discrete times to trigger value increase scheme recalculation.

The equivalent resource optimization calculator 116 can receive as input the demand elasticity curve from the demand elasticity curve calculator 114, the cost of production from production capacity calculator 110, money utilization data from the nominal equivalent resource usage monitor 102, and workload scheduling constraints 117. The equivalent resource optimization calculator 116 can calculate a potential value increase for the service as a function of effective cost of production for the service, including cost of extra (safety) capacity of resources to satisfy service SLA because of usage variability. In some examples, the output of the equivalent resource optimization calculator 116 may be internal and based on the service provider preferences. For example, an equivalent resource value can be calculated to increase the number of users on the same capacity, or lower the peak capacity sizing for the same user population, or any combination thereof.

The value increase scheme calculator 118 can calculate a value increase scheme. For example, the value increase scheme may include brackets of usage within a billing period eligible for specific discounts. For example, a customer may pay 20 equivalent resource units 100% of the time, but 100 equivalent resource units only 50% of the time, 200 resource units only 25% of the time, and 300 resource units only 15% of the time. This implies a 50% utilization of the 100th equivalent resource unit, 25% utilization of the 200th equivalent resource unit, and 15% utilization of the 300th equivalent resource unit. In some examples, according to a provider defined value increase scheme, the 100th equivalent resource unit may receive a discount for 50% usage, the 200th equivalent resource unit may receive a discount for 25% usage, and the $300^{th}$ equivalent resource unit may receive a discount associated with the 15% usage. In some examples, any value increase scheme ranging from continuous value increase schemes to any number of discrete utilization brackets may be used. In some examples, the scheme calculator 118 can calculate a value increase scheme based on one or more objectives 119. For example, the objectives 119 may be business objectives such as target profit margins.

In some examples, the scheme may be made public to service users via the user workload device 120. For example, the value increase scheme 118 can send the calculated value increase scheme to the user workload device 120.

The user workload device 120 can display the value increase scheme to one or more service users. The user workload device 120 may then receive workload constraints from the user and send the workload constraints to a workload scheduler 122.

The workload scheduler 122 can execute in response to receiving a demand from the user workload device 120 corresponding to a user request. In some examples, the workload scheduler 122 can may also receive workload scheduling constraints. For example, the workload scheduling constraints may be receives in the form of deadlines. In some examples, service-level agreements (SLAs) associated with the users' workloads can be received and translated into workload constraints. In some examples, the workload scheduler 122 can calculate workload constraints implicitly from the workload to be scheduled. For example, a preemptible virtual machine instance may have relaxed scheduling constraints. A preemptible virtual machine instances is an instance of a virtual machine that may be terminated by the workload scheduler 122 to provide additional resources for other workloads with higher priority. For example, preemptible virtual machine instances may be used to process batch processing workloads. By contrast, in some examples, an instance of a database on which other services depend that is being launched may be scheduled to be run as soon as possible. In some examples, the workload scheduler 122 can schedule user workload service operations to increase a value increase while respecting constraints based on the workload constraint input from the user workload device 120, as well as the input from the value increase scheme 118 and the service infrastructure utilization monitor 104. The dashed arrow 124 denotes a potential effect on the future service demand. Such a "value back"/"value increase" scheme may simultaneously reduce providers' need for extra safety capacity while providing higher value to users. The workload scheduler 122 can thus utilize the flexibility in user workload deadlines to produce a schedule with highest value to the user.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional user workload devices, monitors, or additional resource servers, etc.).

Figure 2:
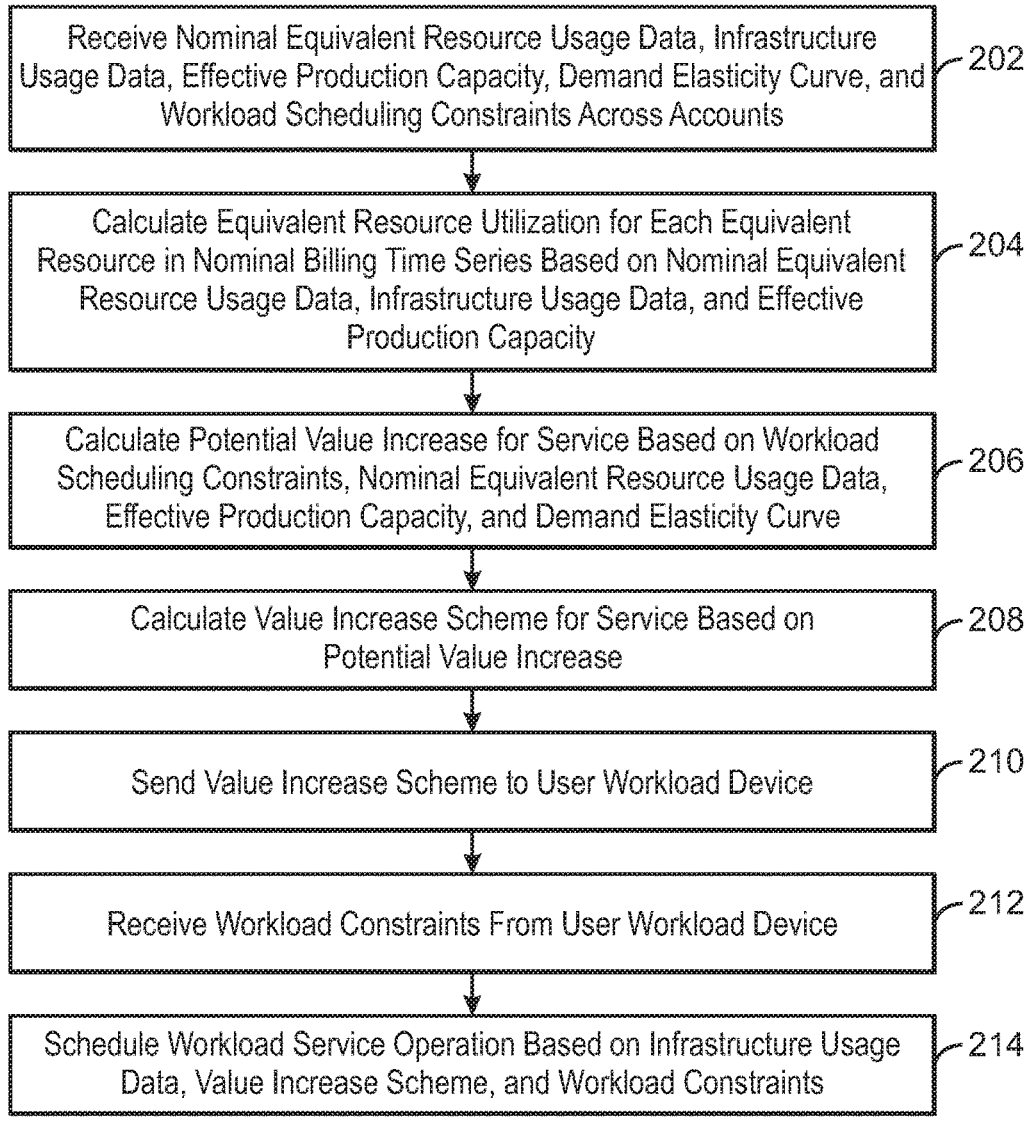
FIG. 2 is a block diagram of an example method that can schedule workload service operations.

FIG. 2 is a process flow diagram of an example method that can schedule workload service operations. The method 200 can be implemented with any suitable computing device, such as the computing device 300 of FIG. 3 and is described with reference to the system 100 of FIG. 1. For example, the method can be implemented using the processor 302 of the computing device 300 of FIG. 3 below.

At block 202, a processor receives a nominal equivalent resource usage data, an infrastructure usage data, an effective production capacity, and a demand elasticity curve, and workload scheduling constraints across a number of accounts. For example, the processor may receive the nominal equivalent resource usage data from a nominal equivalent resource usage monitor. The processor may receive the infrastructure usage data from a service infrastructure utilization monitor.

At block 204, the processor calculates an equivalent resource utilization for an equivalent resource in a nominal billing time series based on the nominal equivalent resource usage data, the infrastructure usage data, and the effective production capacity. For example, the processor can compute an amount of time out of the billing period the equivalent resource was used. In some examples, the processor can calculate a total equivalent resource utilization curve over the whole billing period and over the whole nominal bill and utilization data. In some examples, the processor can calculates an equivalent resource utilization for an equivalent resource in a nominal billing time series at a predetermined recurring period. For example, the predetermined recurring period may correspond to a billing period.

At block 206, the processor calculates a potential value increase for a service based on the workload scheduling constraints, the nominal equivalent resource usage data, the effective production capacity, and the demand elasticity curve. In some examples, the processor can calculate the potential value increase for the service at a predetermined recurring period.

At block 208, the processor calculates a value increase scheme for the service based on the potential value increase. For example, the value increase scheme may include brackets of usage within a billing period that are eligible for specific discounts. In some examples, the processor can calculate the value increase scheme for the service at a predetermined recurring period. In some examples, the value increase scheme can be calculated to increase the number of users on the same capacity, or lower the peak capacity sizing for the same user population, or any combination thereof.

At block 210, the processor sends the value increase scheme to a user workload device. For example, the processor may send the value increase scheme to the user workload device in response to receiving a request for a sustained used discount.

At block 212, the processor receives workload constraints from the user workload device. For example, the workload constraints may be deadlines for performing one or more workload service operations. In some examples, the workload constraints can be translated from SLAs received from the user workload device.

At block 214, the processor schedules a workload service operation based on the infrastructure usage data, the value increase scheme, and the workload constraint. For example, the processor can schedule user workload service operations to increase a value increase while respecting constraints based on the workload constraint input from the user workload device. For example, workload service operations may include actual workload executions that increase value to both the provider by smoothing production and one or more users through the value increase scheme.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method 200 can also include monitoring the service and accumulating nominal billing files and generate the nominal equivalent resource usage data. The method 200 can further include monitoring infrastructure and generate the infrastructure usage data.

Figure 3:
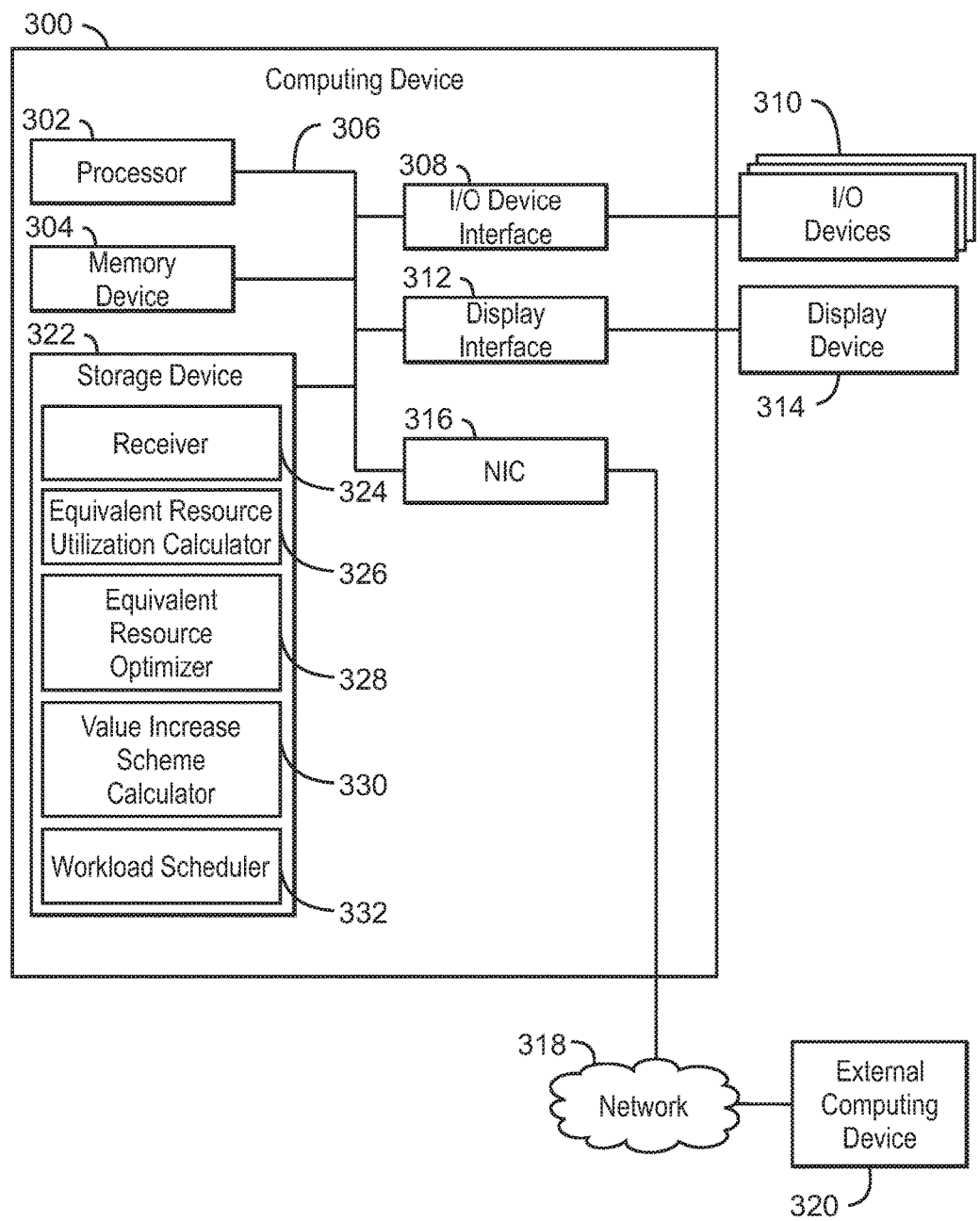
FIG. 3 is a block diagram of an example computing device that can schedule workload service operations.

FIG. 3 is block diagram of an example computing device that can schedule workload service operations. The computing device 300 may be for example, a server, desktop computer, laptop computer, tablet computer, or smartphone. In some examples, computing device 300 may be a cloud computing node. Computing device 300 may be described in the general context of computer system executable instructions, such as program modules, being executed by a computer system. Generally, program modules may include routines, programs, objects, components, logic, data structures, and so on that perform particular tasks or implement particular abstract data types. Computing device 300 may be practiced in distributed cloud computing environments where tasks are performed by remote processing devices that are linked through a communications network. In a distributed cloud computing environment, program modules may be located in both local and remote computer system storage media including memory storage devices.

The computing device 300 may include a processor 302 that is to execute stored instructions, a memory device 304 to provide temporary memory space for operations of said instructions during operation. The processor can be a single-core processor, multi-core processor, computing cluster, or any number of other configurations. The memory 304 can include random access memory (RAM), read only memory, flash memory, or any other suitable memory systems.

The processor 302 may be connected through a system interconnect 306 (e.g., PCI®, PCI-Express®, etc.) to an input/output (I/O) device interface 308 adapted to connect the computing device 300 to one or more I/O devices 310. The I/O devices 310 may include, for example, a keyboard and a pointing device, wherein the pointing device may include a touchpad or a touchscreen, among others. The I/O devices 310 may be built-in components of the computing device 300, or may be devices that are externally connected to the computing device 300.

The processor 302 may also be linked through the system interconnect 306 to a display interface 312 adapted to connect the computing device 300 to a display device 314. The display device 314 may include a display screen that is a built-in component of the computing device 300. The display device 314 may also include a computer monitor, television, or projector, among others, that is externally connected to the computing device 300. In addition, a network interface controller (NIC) 316 may be adapted to connect the computing device 300 through the system interconnect 306 to the network 318. In some embodiments, the NIC 316 can transmit data using any suitable interface or protocol, such as the internet small computer system interface, among others. The network 318 may be a cellular network, a radio network, a wide area network (WAN), a local area network (LAN), or the Internet, among others. An external computing device 320 may connect to the computing device 300 through the network 318. In some examples, external computing device 120 may be an external web-server 120. In some examples, external computing device 120 may be a cloud computing node.

The processor 302 may also be linked through the system interconnect 306 to a storage device 322 that can include a hard drive, an optical drive, a USB flash drive, an array of drives, or any combinations thereof. In some examples, the storage device may include a receiver 324, an equivalent resource utilization calculator 326, an equivalent resource optimization calculator 328, and a value increase scheme calculator 330, and a workload scheduler 332. The receiver 324 can receive a nominal equivalent resource usage data, an infrastructure usage data, an effective production capacity, a demand elasticity curve, and workload scheduling constraints across a plurality of accounts. The equivalent resource utilization calculator 326 can calculate an equivalent resource utilization for an equivalent resource in a nominal billing time series based on the nominal equivalent resource usage data, the infrastructure usage data, and the effective production capacity. For example, the equivalent resource utilization calculator 326 can compute an amount of time out of the billing period the equivalent resource was used. In some examples, the equivalent resource utilization calculator 326 can calculate a total equivalent resource utilization curve over the whole billing period and over the whole nominal bill and utilization data. The equivalent resource optimization calculator 328 can calculate a potential value increase for a service based on the workload scheduling constraints, the nominal equivalent resource usage data, the effective production capacity, and the demand elasticity curve. For example, the equivalent resource optimization calculator 328 can calculate the equivalent resource value to increase the number of users on the same capacity, or lower the peak capacity sizing for the same user population, or both. The value increase scheme calculator 330 can calculate a value increase scheme for the service based on the potential value increase. For example, the value increase scheme may include brackets of usage within a billing period that are eligible for specific discounts. The value increase scheme calculator 330 can also send the value increase scheme to a user workload device. The workload scheduler 332 can receive a workload constraint from the user workload device. The workload scheduler 332 can schedule a workload service operation based on the infrastructure usage data, the value increase scheme, and the workload constraint.

It is to be understood that the block diagram of FIG. 3 is not intended to indicate that the computing device 300 is to include all of the components shown in FIG. 3. Rather, the computing device 300 can include fewer or additional components not illustrated in FIG. 3 (e.g., additional memory components, embedded controllers, modules, additional network interfaces, etc.). For example, the computing device 300 can also include a nominal equivalent resource usage monitor to monitor the service and accumulate nominal billing files and generate the nominal equivalent resource usage data. The computing device 300 may also include a service infrastructure utilization monitor to monitor infrastructure and generate the infrastructure usage data. Furthermore, any of the functionalities of the receiver 324, the equivalent resource utilization calculator 326, the equivalent resource optimization calculator 328, the value increase scheme calculator 330, and the workload scheduler 332, may be partially, or entirely, implemented in hardware and/or in the processor 302. For example, the functionality may be implemented with an application specific integrated circuit, logic implemented in an embedded controller, or in logic implemented in the processor 302, among others. In some embodiments, the functionalities of the receiver 324, the equivalent resource utilization calculator 326, the equivalent resource optimization calculator 328, the value increase scheme calculator 330, and the workload scheduler 332 can be implemented with logic, wherein the logic, as referred to herein, can include any suitable hardware (e.g., a processor, among others), software (e.g., an application, among others), firmware, or any suitable combination of hardware, software, and firmware.

Figure 4:
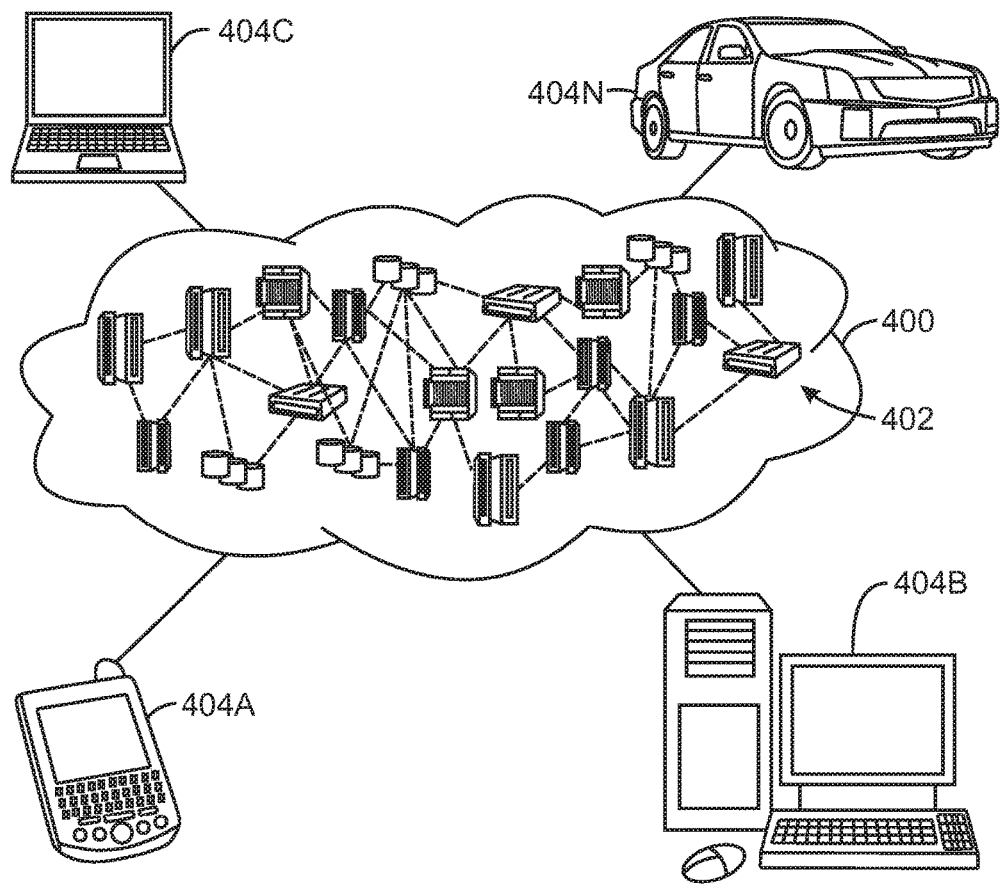
FIG. 4 is a process flow diagram of an example cloud computing environment according to embodiments described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
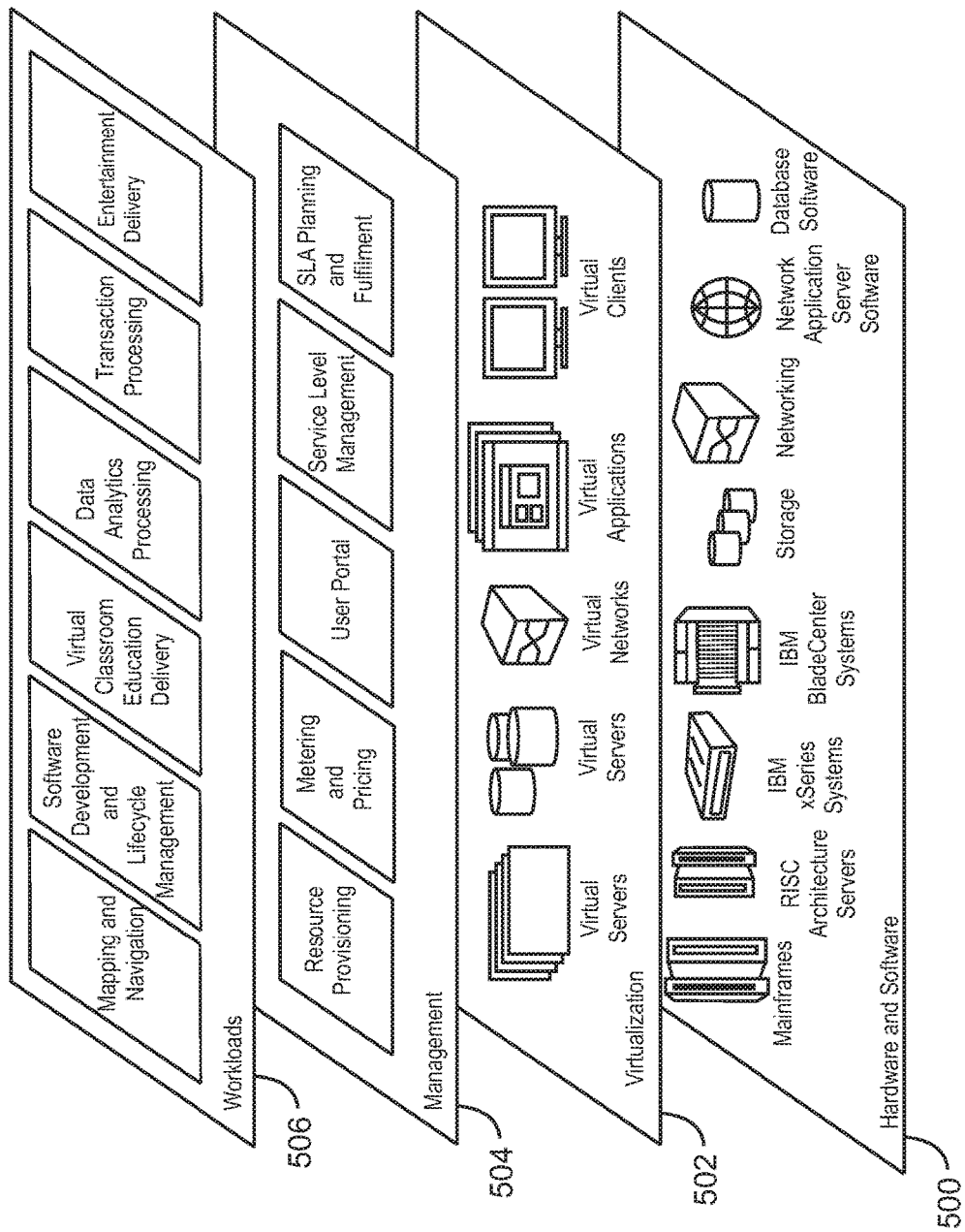
FIG. 5 is a process flow diagram of an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and entertainment delivery.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
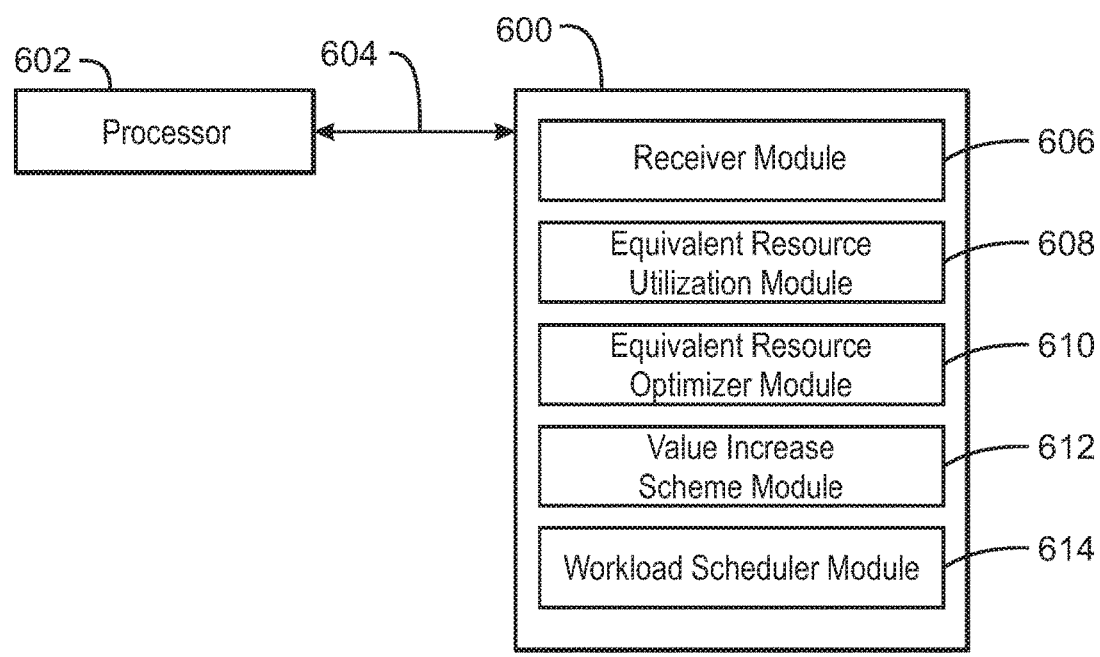
FIG. 6 is an example tangible, non-transitory computer-readable medium that can schedule workload service operations.

Referring now to FIG. 6, a block diagram is depicted of an example tangible, non-transitory computer-readable medium 600 that can schedule workload service operations. The tangible, non-transitory, computer-readable medium 600 may be accessed by a processor 602 over a computer interconnect 604. Furthermore, the tangible, non-transitory, computer-readable medium 600 may include code to direct the processor 602 to perform the operations of the method 200 of FIG. 2 above.

The various software components discussed herein may be stored on the tangible, non-transitory, computer-readable medium 600, as indicated in FIG. 6. For example, a receiver module 606 includes code to receive a nominal equivalent resource usage data, an infrastructure usage data, an effective production capacity, a demand elasticity curve, and workload scheduling constraints across a plurality of accounts. The receiver module 606 can also include code to monitor the service and accumulate nominal billing files and generate the nominal equivalent resource usage data. In some examples, the receiver module 606 includes code to monitor infrastructure and generate the infrastructure usage data. An equivalent resource utilization module 608 includes code to calculate an equivalent resource utilization for an equivalent resource in a nominal billing time series based on the nominal equivalent resource usage data, the infrastructure usage data, and the effective production capacity. The equivalent resource utilization module 608 further includes code to compute an amount of time out of the billing period the equivalent resource was used. The equivalent resource utilization module 608 also includes code to calculate a total equivalent resource utilization curve over the whole billing period and over the whole nominal bill and utilization data. An equivalent resource optimization module 610 includes code to calculate a potential value increase for a service based on the workload scheduling constraints, the nominal equivalent resource usage data, the effective production capacity, and the demand elasticity curve. The module 610 also includes code to calculate the equivalent resource value to increase the number of users on the same capacity, or lower the peak capacity sizing for the same user population, or both. A value increase scheme module 612 includes code to calculate a value increase scheme for the service based on the potential value increase. The value increase scheme module 612 includes code to send the value increase scheme to a user workload device. The receiver module 606 also includes code to receive a workload constraint from the user workload device. For example, the receiver module 606 may receive the workload constraint from the user workload device in response to the sending of the value increase scheme. A workload scheduler module 614 includes code to schedule a workload service operation based on the infrastructure usage data, the value increase scheme, and the workload constraint. In some examples, the workload scheduler module 614 can include code to translate the workload constraint from a service level agreement received from the user workload device. It is to be understood that any number of additional software components not shown in FIG. 6 may be included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 6 may be included within the tangible, non-transitory, computer-readable medium 600, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a nominal equivalent resource usage data, an infrastructure usage data, an effective production capacity, a demand elasticity curve, and workload scheduling constraints across a plurality of accounts;
   calculate an equivalent resource utilization for an equivalent resource in a nominal billing time series based on the nominal equivalent resource usage data, the infrastructure usage data, and the effective production capacity;
   calculate a potential value increase for a service based on the workload scheduling constraints, the nominal equivalent resource usage data, the effective production capacity, and the demand elasticity curve;
   calculate a value increase scheme for the service based on the potential value increase;
   send the value increase scheme to a user workload device;
   receive a workload constraint from the user workload device; and
   schedule a workload service operation based on the infrastructure usage data, the value increase scheme, and the workload constraint.

2. The system of claim 1, wherein to calculate the equivalent resource utilization the processor is to compute an amount of time out of a billing period the equivalent resource was used.

3. The system of claim 1, wherein to calculate the equivalent resource utilization the processor is to calculate a total equivalent resource utilization curve over a whole billing period and over a whole nominal bill and utilization data.

4. The system of claim 1, wherein the processor is to calculate the equivalent resource value to increase a number of users on a same capacity, or lower a peak capacity sizing for a same user population, or both.

5. The system of claim 1, wherein the value increase scheme comprises brackets of usage within a billing period that are eligible for specific discounts.

6. The system of claim 1, further comprising a nominal equivalent resource usage monitor to monitor the service and accumulate nominal billing files and generate the nominal equivalent resource usage data.

7. The system of claim 6, further comprising a service infrastructure utilization monitor to monitor infrastructure and generate the infrastructure usage data.

8. A computer-implemented method, comprising:
   receiving, via a processor, a nominal equivalent resource usage data, an infrastructure usage data, an effective production capacity, a demand elasticity curve, and workload scheduling constraints across a plurality of accounts;
   calculating, via the processor, an equivalent resource utilization for an equivalent resource in a nominal billing time series based on the nominal equivalent resource usage data, the infrastructure usage data, and the effective production capacity;
   calculating, via the processor, a potential value increase for a service based on the workload scheduling constraints, the nominal equivalent resource usage data, the effective production capacity, and the demand elasticity curve;
   calculating, via the processor, a value increase scheme for the service based on the potential value increase;
   sending, via the processor, the value increase scheme to a user workload device;
   receiving, via the processor, a workload constraint from the user workload device; and
   scheduling, via the processor, a workload service operation based on the infrastructure usage data, the value increase scheme, and the workload constraint.

9. The computer-implemented method of claim 8, wherein calculating the equivalent resource utilization comprises computing an amount of time out of a billing period the equivalent resource was used.

10. The computer-implemented method of claim 8, wherein calculating the equivalent resource utilization comprises calculating a total equivalent resource utilization curve over a whole billing period and over a whole nominal bill and utilization data.

11. The computer-implemented method of claim 8, wherein calculating the equivalent resource value comprises calculating an equivalent resource value to increase a number of users on a same capacity, or lower a peak capacity sizing for a same user population, or both.

12. The computer-implemented method of claim 8, comprising translating the workload constraint from a service level agreement received from the user workload device.

13. The computer-implemented method of claim 8, further comprising monitoring the service and accumulating nominal billing files and generate the nominal equivalent resource usage data.

14. The computer-implemented method of claim 8, further comprising monitoring infrastructure and generate the infrastructure usage data.

15. A computer program product for scheduling workload service operations, the computer program product comprising a computer-readable storage medium having program code embodied therewith, wherein the computer readable storage medium is not a transitory signal per se, the program code executable by a processor to cause the processor to:

receive a nominal equivalent resource usage data, an infrastructure usage data, an effective production capacity, a demand elasticity curve, and workload scheduling constraints across a plurality of accounts;

calculate an equivalent resource utilization for an equivalent resource in a nominal billing time series based on the nominal equivalent resource usage data, the infrastructure usage data, and the effective production capacity;

calculate a potential value increase for a service based on the workload scheduling constraints, the nominal equivalent resource usage data, the effective production capacity, and the demand elasticity curve;

calculate a value increase scheme for the service based on the potential value increase;

send the value increase scheme to a user workload device;

receive a workload constraint from the user workload device; and schedule a workload service operation based on the infrastructure usage data, the value increase scheme, and the workload constraint.

16. The computer program product of claim 15, further comprising program code executable by the processor to compute an amount of time out of a billing period the equivalent resource was used.

17. The computer program product of claim 15, further comprising program code executable by the processor to calculate a total equivalent resource utilization curve over a whole billing period and over a whole nominal bill and utilization data.

18. The computer program product of claim 15, further comprising program code executable by the processor to calculate the equivalent resource value to increase a number of users on the same capacity, or lower a peak capacity sizing for a same user population, or both.

19. The computer program product of claim 15, further comprising program code executable by the processor to translate the workload constraint from a service level agreement received from the user workload device.

20. The computer program product of claim 15, further comprising program code executable by the processor to monitor the service and accumulate nominal billing files and generate the nominal equivalent resource usage data.

* * * * *